United States Patent [19]
Holtan et al.

[11] Patent Number: 6,012,652
[45] Date of Patent: Jan. 11, 2000

[54] ATOMIZING NOZZLE AND METHOD OF USE THEREOF

[75] Inventors: Timothy Paul Holtan, Port Melbourne, Australia; Gregory Patrick Muldowney, Glen Mills, Pa.

[73] Assignee: Mobil Oil Corporation, Fairfax, Va.

[21] Appl. No.: 09/016,570

[22] Filed: Jan. 30, 1998

[51] Int. Cl.[7] ............................................. B05B 1/14
[52] U.S. Cl. ................................. 239/430; 239/568
[58] Field of Search ........................... 239/562, 568, 239/556, 597, 596, 598, 557, 398, 430

[56] References Cited

U.S. PATENT DOCUMENTS

| | | | |
|---|---|---|---|
| 1,026,815 | 5/1912 | Matteson | 234/568 X |
| 1,094,124 | 4/1914 | Coen | 239/568 X |
| 1,308,613 | 7/1919 | Anderson | 239/568 X |
| 1,783,237 | 12/1930 | Greer | 239/568 |
| 1,809,658 | 6/1931 | Wendt | 239/568 |
| 2,356,944 | 8/1944 | Peeps | 324/568 X |
| 2,754,894 | 7/1956 | Dornback | 239/568 X |
| 2,856,236 | 10/1958 | Hunzicker | 239/568 X |
| 3,043,577 | 7/1962 | Berry | 239/568 X |
| 3,206,393 | 9/1965 | Pohlenz | 208/164 |
| 3,261,777 | 7/1966 | Iscol et al. | 208/113 |
| 4,601,814 | 7/1986 | Mauleon et al. | 208/113 |
| 4,640,463 | 2/1987 | Krambeck et al. | 239/424 |
| 4,650,566 | 3/1987 | Buyan et al. | 208/153 |
| 5,017,343 | 5/1991 | Cetinkaya | 422/140 |
| 5,139,748 | 8/1992 | Lomas et al. | 422/140 |
| 5,174,889 | 12/1992 | Nielsen | 208/113 |
| 5,289,976 | 3/1994 | Dou et al. | 239/431 |
| 5,306,418 | 4/1994 | Dou et al. | 208/157 |
| 5,322,618 | 6/1994 | Raterman | 208/113 |
| 5,328,591 | 7/1994 | Raterman | 208/113 |
| 5,673,859 | 10/1997 | Haruch | 231/568 X |

FOREIGN PATENT DOCUMENTS

| | | | |
|---|---|---|---|
| 7808562 | 2/1992 | Australia | 239/598 |

OTHER PUBLICATIONS

U.S. application No. 09/016,627, Muldowney et al., filed Jan. 30, 1998.

Lefebvre, A.H., "Airblast Atomization", *Prog. Energy Combust. Sci.,* 1980, 6, 233–261.

*Primary Examiner*—Kevin Weldon
*Attorney, Agent, or Firm*—Malcolm D. Keen

[57] ABSTRACT

The present invention provides a nozzle, nozzle assembly, and method of use thereof for atomizing a liquid stream into a flat fan-shaped spray. The nozzle and nozzle assembly are particularly useful for atomizing a hydrocarbon feed into a catalytic cracking zone of a fluid catalytic cracking (FCC) process. The nozzle includes a nozzle tip that has at least three substantially vertical openings extending from the inner surface of the nozzle tip to the outer surface of the nozzle tip. The openings are angled from 0 degrees to about 75 degrees. The present invention also provides a nozzle assembly containing at least three nozzles of the present invention that are radially mounted around the perimeter of an area to be sprayed.

20 Claims, 7 Drawing Sheets

ATOMIZING NOZZLE AND METHOD OF USE THEREOF

FIELD OF INVENTION

This invention relates to a nozzle, a nozzle assembly, and method of use thereof for atomizing a liquid stream. More particularly, this invention relates to a nozzle, a nozzle assembly, and method of use thereof for atomizing a liquid stream in the presence of a dispersion medium to provide a fan-shaped spray of liquid droplets. The nozzle, nozzle assembly and method of use thereof is particularly useful for injecting radially a stream containing a hydrocarbon feed into a catalytic cracking zone of a fluid catalytic cracking unit.

BACKGROUND OF THE INVENTION

Fluid catalytic cracking (FCC) of petroleum fractions is a well-established refinery operation. In FCC, heavy hydrocarbon fractions (greater than about 20 to about 30 carbon atoms in length) are chemically broken down into lighter hydrocarbon fractions (less than about 12 to about 15 carbons in length), such as gasoline. The FCC unit usually comprises a reactor section connected to a regenerator section by standpipes. The catalyst itself is a finely divided solid and behaves like a fluid in the reactor, regenerator, and connecting standpipes, hence the designation "fluid" catalyst.

In the operation of the FCC process, fresh hydrocarbon feed, which may be preheated, is mixed with catalyst and undergoes cracking within the catalytic conversion zone of the reactor section. The catalytic conversion zone, in modern FCC units, is primarily located in the riser of the reactor section. For catalytic cracking to occur, the hydrocarbon feed (e.g., oil), must be vaporized to permit the hydrocarbon feed to diffuse into the pores of the catalyst (generally a zeolite) to the cracking sites. The catalytic cracking reaction results in coke being deposited onto the catalyst to form "coked" or "Spent" catalyst. Products exit the reactor in the vapor phase and pass to at least one main fractionator or distillation column for separation into desired fractions. The spent catalyst passes continuously from the reactor to the regenerator via a spent catalyst standpipe. In the regenerator, the coke is converted in an exothermic reaction to gaseous products by contact with an oxygen-containing gas. The flue gas passes out of the regenerator through various heat recovery means, and the hot regenerated catalyst is recirculated to the reactor via a return catalyst standpipe where it is again picked up by fresh hydrocarbon feed. Typically, heat released in the regenerator is carried to the reactor by the hot regenerated catalyst to supply heat for the endothermic cracking reactions. Typical fluid catalyst cracking systems are disclosed in U.S. Pat. Nos. 3,206,393 to Pohlenz and 3,261,777 to Iscol, et al., which are hereby incorporated by reference in their entireties.

Nozzles are used to inject the hydrocarbon feed, typically in the form of a liquid spray, into the catalytic conversion zone of the riser. To form a spray, typically, the hydrocarbon feed is combined with a dispersion medium, such as steam, to form a dispersed hydrocarbon stream. The one or more nozzles used to inject the dispersed hydrocarbon stream into the catalytic conversion zone may be axially or radially disposed.

With axial nozzles, coverage is achieved by using one or more nozzles that extend into the riser section of an FCC unit and terminate at a set of points within the riser cross-sectional area. The axial nozzles are preferably oriented almost or perfectly vertical (preferably within about 10° of the vertical axis of the riser) to create a flow of hydrocarbon feed that is preferably parallel to the upflowing catalyst. With radial nozzles, coverage is achieved by using a plurality of nozzles that are mounted around the perimeter of the riser wall. Preferably, the radial nozzles extend minimally into the riser itself. This orientation of the nozzles creates a flow of hydrocarbon feed that crosses with the upward flow of catalyst. Radial nozzles are preferably oriented with respect to the vertical axis of the riser at any angle from about 10° pointing upward to about 90° horizontal). To provide optimal catalytic cracking conditions, nozzles in either orientation must collectively spray the dispersed hydrocarbon stream in a pattern that expands to cover the entire cross-sectional area of the riser through which the cracking catalyst is flowing. Improved coverage provides better catalyst-hydrocarbon feed mixing that enhances catalytic cracking reactions and minimizes thermal cracking reactions. Thermal cracking reactions produce undesirable products such as methane and ethane that lead to decreased yields of more valuable FCC products.

In addition to full spray coverage, the nozzles should produce fine hydrocarbon feed droplets that are preferably comparable to the size of individual catalyst particles. Preferably the hydrocarbon feed droplets have a Sauter mean diameter (i.e., the diameter of a sphere having the same volume to surface area ratio as the measured droplets) of less than 100 microns ($\mu$m). As droplet size decreases, the ratio of hydrocarbon feed drop surface area to volume increases, which accelerates heat transfer from the catalyst to the hydrocarbon feed and shortens hydrocarbon feed vaporization time. Quicker vaporization improves yield of catalytic cracking reaction products since the hydrocarbon feed as a vapor is able to diffuse into the pores of the catalyst. Conversely, any delay in hydrocarbon feed vaporization, and/or mixing of the hydrocarbon feed and catalyst, leads to increased yields of thermal cracking products and coke.

The majority of FCC nozzles in use today, whether radial or axial, employ high velocities (e.g., about greater than 300 feet per second) of the dispersed hydrocarbon stream to shear the hydrocarbon feed into small droplet for injecting the droplets into the catalytic conversion zone. However, high velocities can have undesirable effects. For example, temperature profiles in commercial units having radial injection sometimes show significantly lower temperatures along the center vertical axis in the catalytic conversion zone of the riser. This temperature profile indicates that the catalyst and feed drops are not being uniformly mixed across the cross-sectional area of the riser. Particularly, the cooler liquid feed droplets are travelling to the center of the riser without exchanging a significant amount of momentum and heat with the catalyst. Therefore, a nozzle is needed that can provide adequate shear at a dispersed hydrocarbon feed velocity which leads to adequate mixing of the hydrocarbon feed droplets and catalyst.

Additionally, many FCC radial nozzles in use today have poor coverage. This problem can be seen when a nozzle is installed which produces smaller droplets, but no increase in yield is observed due to poor contacting of the droplets and catalyst.

U.S. Pat. No. 4,601,814 to Mauleon et al., (hereinafter "Mauleon") discloses a high-velocity radially oriented nozzle for atomizing residual oils in a catalytic cracking process. In one embodiment, the nozzle end is a single horizontal restricted slot opening that creates a fan-shaped spray pattern. Mauleon also discloses that the nozzle end may be two parallel slots or two slots 90° to one another. The discharge velocity of the atomized feed oil is high, exceeding 300 feet per second and more preferably 500 feet per second. However, for the reasons previously stated, a nozzle requiring high velocities may be ineffective.

Thus it is desirable to develop a nozzle and nozzle assembly that produces a spray of fine hydrocarbon liquid droplets that covers the entire cross section of the catalytic cracking zone without requiring high nozzle velocities.

SUMMARY OF THE INVENTION

The present invention provides a nozzle for atomizing a liquid stream into a fan-shaped spray. The nozzle includes: (a) a nozzle barrel for receiving a liquid stream and dispersion medium, having a center longitudinal axis, an inlet end, and a tip end; (b) a tip, connected to the tip end of the nozzle barrel and having a vertical centerline, an inner surface and an outer surface; and (c) at least three substantially vertical openings extending through the inner surface of the tip to the outer surface of the tip, each opening having a length and width, wherein the length of the opening is greater than the width; each opening further having a first midpoint on the inner surface of the tip, and a second midpoint on the outer surface of the tip, and a center longitudinal axis formed by a line intersecting the first and second midpoints, and wherein an angle θ, formed between the center longitudinal axis of each opening and the center longitudinal axis of the nozzle barrel, is from 0 to about 75 degrees.

In another embodiment of the present invention a nozzle assembly for atomizing a liquid stream is provided. The nozzle assembly includes at least 3 nozzles of the present invention that are radially mounted around a perimeter of an area to be sprayed.

In another embodiment of the present invention a process for atomizing a liquid stream is provided. The process includes: (a) combining a liquid stream and a dispersion medium to form a dispersed liquid stream; (b) feeding the dispersed liquid stream through at least a portion of at least one nozzle having a nozzle barrel, wherein the nozzle barrel has a longitudinal axis, an inlet end, and a tip end; (c) directing the dispersed liquid stream through a tip connected to the tip end of the nozzle barrel, wherein the tip has a vertical centerline, an inner surface, an outer surface, and at least at least three substantially vertical openings extending through the inner surface of the tip to the outer surface of the tip, each opening having a length and width, wherein the length of the opening is greater than the width; each opening further having a first midpoint on the inner surface of the tip, and a second midpoint on the outer surface of the tip, and a center longitudinal axis formed by a line intersecting the first and second midpoints, and wherein an angle θ, formed between the center longitudinal axis of each opening and the center longitudinal axis of the nozzle barrel, is from 0 to about 75 degrees; and (d) directing the dispersed liquid stream through the openings of the tip to form a flat fan-shaped spray.

In a preferred embodiment of the present invention, the nozzle and nozzle assembly is used in a fluid catalytic cracking unit to atomize hydrocarbon feed.

DETAILED DESCRIPTION OF THE INVENTION

The present invention provides a nozzle and nozzle assembly that when operated under proper conditions produces a flat fan-shaped spray of fine liquid droplets. Another feature of the nozzle of the present invention is that it is particularly useful for atomizing a liquid stream having a low velocity. For example, the nozzle of the present invention, when operated under proper conditions, is effective in atomizing a liquid stream having a velocity of less than 300 feet per second, and more preferably less than 200 feet per second. However, the nozzle of the present invention may also be used to atomize a liquid stream having a velocity of greater than 300 feet per second. The nozzle is preferably designed to feed a liquid hydrocarbon stream into the catalytic conversion zone of a fluid catalytic cracking unit.

As used herein, "liquid stream" means any stream containing a liquid, such as a hydrocarbon feed, that is to be atomized. By "dispersing medium" it is meant a fluid, typically a gas-containing fluid such as steam, that is used to enhance the atomization of the liquid. By "fine" it is meant that the Sauter mean diameter of the liquid droplets in the spray is preferably less than 300 microns ($\mu$m), more preferably less than 200 $\mu$m and most preferably less than 100 $\mu$m. By "flat fan-shaped" it is meant that the ratio of the horizontal dimension to the vertical dimension of the spray, taken at any cross-section perpendicular to the longitudinal axis of the nozzle barrel, is preferably greater than 4:1, more preferably greater than 6:1, and most preferably greater than 8:1.

Figure 1:
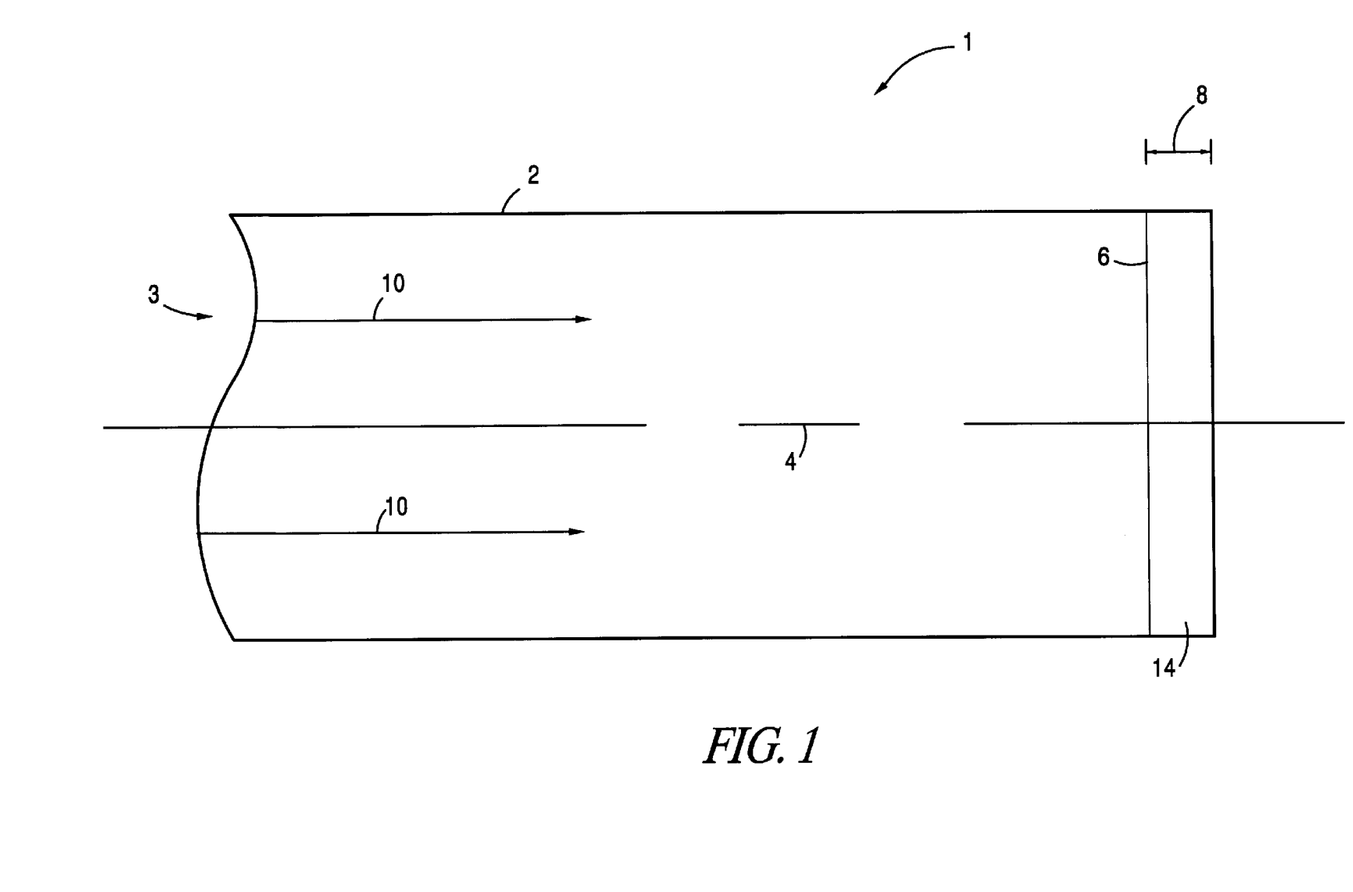
FIG. 1 shows an end portion of a nozzle of the present invention.

The nozzle of the present invention includes a nozzle barrel for receiving a stream of liquid and dispersion medium and a tip having at least three substantially vertical openings. Referring to the Figures, where like reference numerals refer to like elements, FIG. 1 shows an embodiment of a nozzle of the present invention and particularly shows the end portion of a nozzle 1. The end portion of the nozzle has a barrel 2 that is cylindrically shaped, a tip end 6, an inlet end 3 opposite the tip end, and a center longitudinal axis 4. The end portion of barrel 2 receives a dispersed liquid stream 10 containing a mixture of a liquid stream to be atomized and a dispersion medium. The dispersed liquid stream 10 is directed to a nozzle tip 14 having a thickness 8 and at least three substantially vertical openings (not shown). The dispersed liquid stream is directed through the openings in the nozzle tip 14.

Figure 2A:
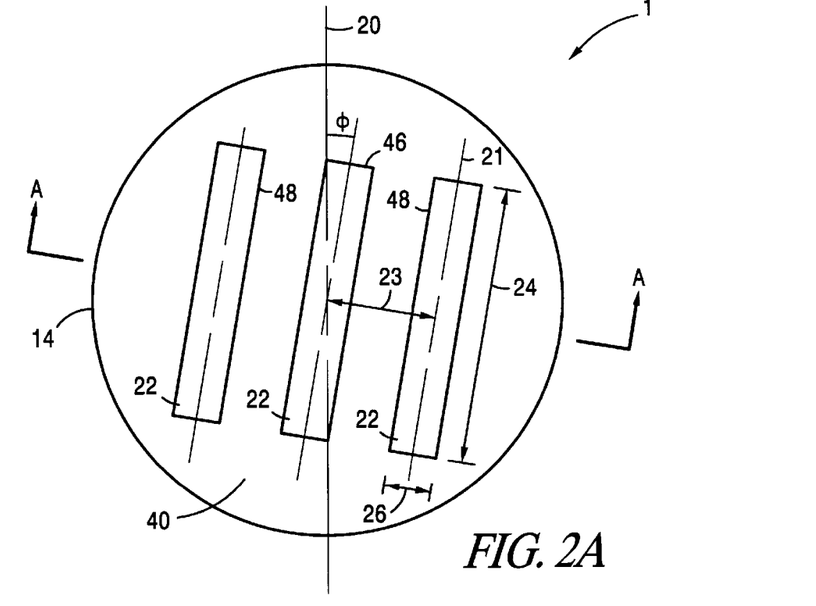
FIG. 2A shows an end view of the nozzle tip in FIG. 1.

The openings in the nozzle tip are shaped in a manner to produce a flat fan-shaped spray. FIG. 2A shows an end view of the nozzle tip 14 in FIG. 1 to show in greater detail the openings. The nozzle tip 14 in FIG. 2A has a vertical centerline 20, and three rectangular shaped openings 22: a center opening 46, located on the nozzle tip vertical centerline 20, and two first removed openings 48. Each opening 22 has a vertical centerline 21, located at the outer surface 40 of the nozzle tip 14, a length 24, that runs parallel to the opening vertical centerline 21, and a width 26, located at the outer surface 40 of the nozzle tip 14, that runs perpendicular to the opening vertical centerline 21. The openings 22 in FIG. 2A are substantially vertical relative to the nozzle tip centerline 20. By "substantially vertical," it is meant that the opening vertical centerline 21 may form an angle φ with the nozzle tip vertical centerline 20 of from 0 (i.e., parallel and perfectly vertical) to about 30 degrees, more preferably from 0 to about 10 degrees, and most preferably from 0 to about 5 degrees.

Each opening 22 is spaced a distance 23 from the nozzle tip vertical centerline 20 as measured between the opening vertical centerline 21 and the nozzle tip vertical centerline 20. The three openings 22 shown in FIG. 2A are preferably symmetrically disposed across the nozzle tip so that the first removed openings 48 oppose each other, and are spaced an equal distance from the nozzle tip vertical centerline 20.

Figure 2B:
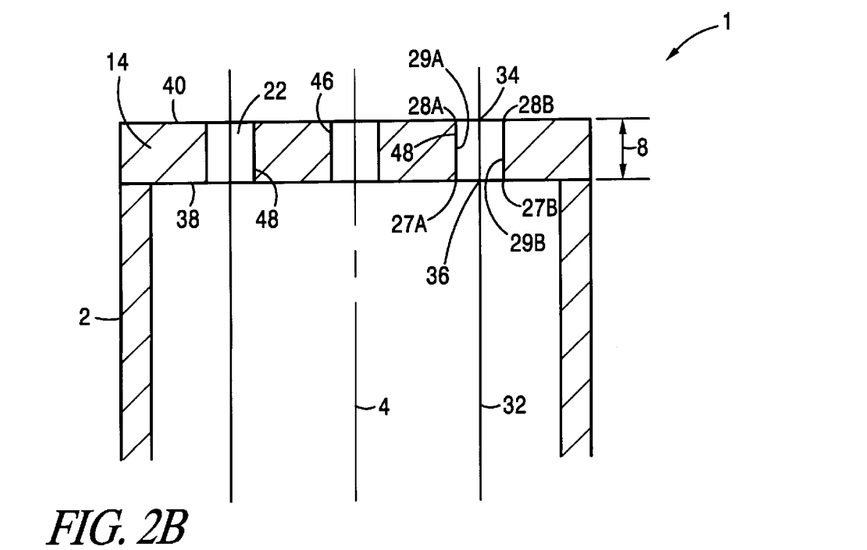
FIG. 2B shows a sectional view of the nozzle in FIG. 2A from section A—A.

A sectional view of the nozzle tip 14 in FIG. 2A at section A—A is shown in FIG. 2B. In FIG. 2B, the openings are shaped to produce a flat fan-shaped spray. Each opening 22 has opposing edges 27A and 27B, extending along the length (not shown) of the opening 22 at the inner surface 38 of the nozzle tip 14, and opposing edges 28A and 28B, extending along the length of the opening 22 at the outer surface 40 of the nozzle tip 14. Edges 27A and 28A are joined by connecting surface 29A, and edges 27B and 28B are joined by connecting surface 29B. In FIG. 2B, connecting surfaces 29A and 29B are shown as parallel to each other and unangled relative to the center longitudinal axis 4 of the nozzle barrel 2.

Each opening also has a center longitudinal axis 32 formed by drawing a line from the midpoint 36 of the opening 22 at the inner surface 38 of the nozzle tip 14 to the midpoint 34 of the opening 22 at the outer surface 40 of the nozzle tip 14. In FIG. 2B, the center longitudinal axis for each opening forms an angle equal to 0 with the nozzle barrel center longitudinal axis 4. Particularly, the center longitudinal axis 32 of the first removed openings 48 are parallel to the nozzle barrel center longitudinal axis 4 and the center longitudinal axis (not shown) of the center opening 46 coincides with the nozzle barrel center longitudinal axis 4.

To increase the horizontal spray angle of the spray, preferably at least one, and more preferably at least two openings, are angled relative to the center longitudinal axis of the nozzle barrel. The openings may be angled by angling the connecting surfaces (29A and 29B in FIG. 2B). The connecting surfaces may be angled in any manner as long as the center longitudinal axis of each opening does not intersect the center longitudinal axis of any other opening downstream of the nozzle tip (i.e. the center longitudinal axes of the openings remain apart downstream of the nozzle tip). For example, the connecting surfaces may be parallel or nonparallel. Also, for example, one connecting surface may be angled while its opposing connecting surface is not angled relative to the nozzle barrel center longitudinal axis. Preferably, the connecting surfaces of an opening are parallel to each other.

To have the center longitudinal axis of the openings remain apart downstream of the nozzle tip, the connecting surfaces are preferably angled so that the angle formed by the center longitudinal axis of the opening and center longitudinal axis of the nozzle barrel is either equal to or greater than an adjacent opening located closer to the nozzle tip vertical centerline. Preferably, the openings are angled so that the horizontal spray angle of the spray is at least 60°, more preferably at least 90°, and most preferably at least 120°.

Figure 3A:
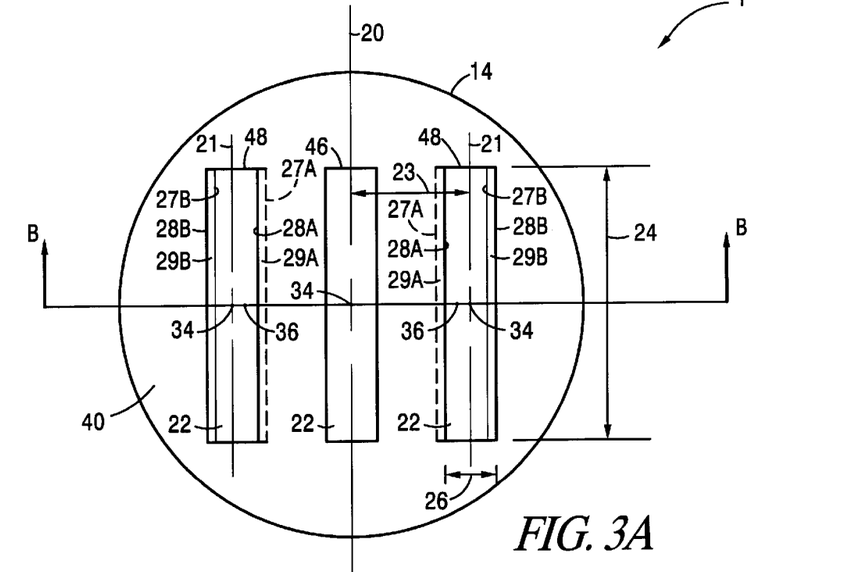
FIG. 3A shows an end view of another embodiment of a nozzle of the present invention.
Figure 3B:
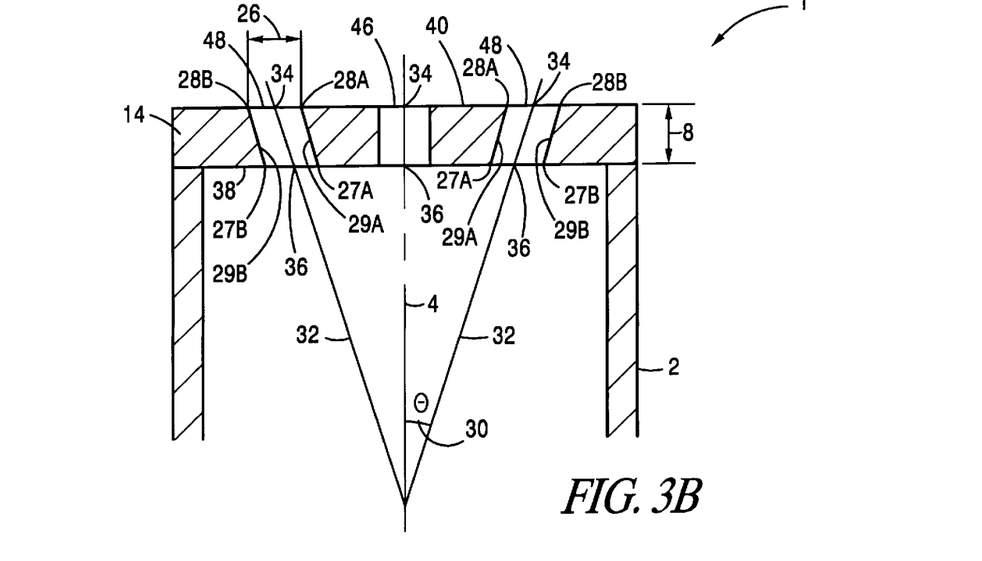
FIG. 3B shows a sectional view of the nozzle in FIG. 3A from section B—B.

A preferred nozzle of the present invention, having at least two angled openings, is shown in FIGS. 3A and 3B. FIG. 3A shows an end view of a nozzle tip 14 having three perfectly vertical openings 22. FIG. 3B shows a sectional view of the nozzle tip 14 in FIG. 3A at section B—B.

In FIG. 3A, the center opening 46 is not angled; however, the first removed openings 48 are angled relative to the nozzle barrel center longitudinal axis 4. The angling of the first removed openings 48 in FIG. 3A is such that opposing edges 27A and 27B that extend the length 24 of the opening at the inner surface (not shown) of the nozzle tip 14 are located closer to the nozzle tip vertical center line 20 than the corresponding opposing edges 28A and 28B located at the outer surface 40 of the nozzle tip 14. The opposing edges 27A and 27B at the inner surface are connected to the opposing edges 28A and 28B at the outer surface of the nozzle tip 14 by connecting surfaces 29A and 29B. Each opening also has a midpoint 34 on the outer surface 40 of the nozzle tip 14, and a midpoint 36 at the inner surface of the nozzle tip 14. In the case of the center opening 46, the midpoint 34 on the outer surface 40 of the nozzle tip 14, corresponds to the midpoint (not shown) at the inner surface since the center opening 46 is not angled.

The angling of the first removed openings 48 is better viewed from FIG. 3B. In FIG. 3B, the connecting surfaces 29A and 29B of the first removed openings 48 extend through the thickness 8 of the nozzle tip 14 to connect opposing edges 27A and 27B at the inner surface 38 of the nozzle tip 14 to opposing edges 28A and 28B at the outer surface 40 of the nozzle tip 14. The angled opposing surfaces 29A and 29B as shown in FIG. 3B are parallel to each other.

In FIG. 3B, each opening also has a center longitudinal axis 32 formed by a line drawn between the midpoint 36 of the opening at the inner surface 38 of the nozzle tip 14 and the midpoint 34 of the opening at the outer surface 40 of the nozzle tip 14. The center opening 46 center longitudinal axis (not shown) coincides with the center longitudinal axis 4 of the nozzle barrel. The first removed openings 48 are angled relative to the nozzle barrel center longitudinal axis 4 to form an angle θ 30. In a preferred embodiment, as shown in FIG. 3B, the first removed openings are angled in opposing directions so as to increase the horizontal spray angle. More preferably, the first removed openings are symmetrical in that they are angled an equal amount in opposing directions.

Although the center opening 46 in FIG. 3B is not angled, it is possible for the center opening to have an angle θ ranging from 0° to about 15°. An angled center opening may be preferred if it is desired to discharge the spray in a direction departing from the nozzle barrel center longitudinal axis, such as to create a swirl flow in a catalytic cracking zone. With an angled center opening, the angle θ of the other openings will need to be adjusted to ensure that the center longitudinal axes of the openings do not intersect downstream of the nozzle tip. For example, it may not be preferred to have the first removed openings be angled an equal amount in opposing directions if this results in the center longitudinal axes of the openings intersecting.

Figure 4:
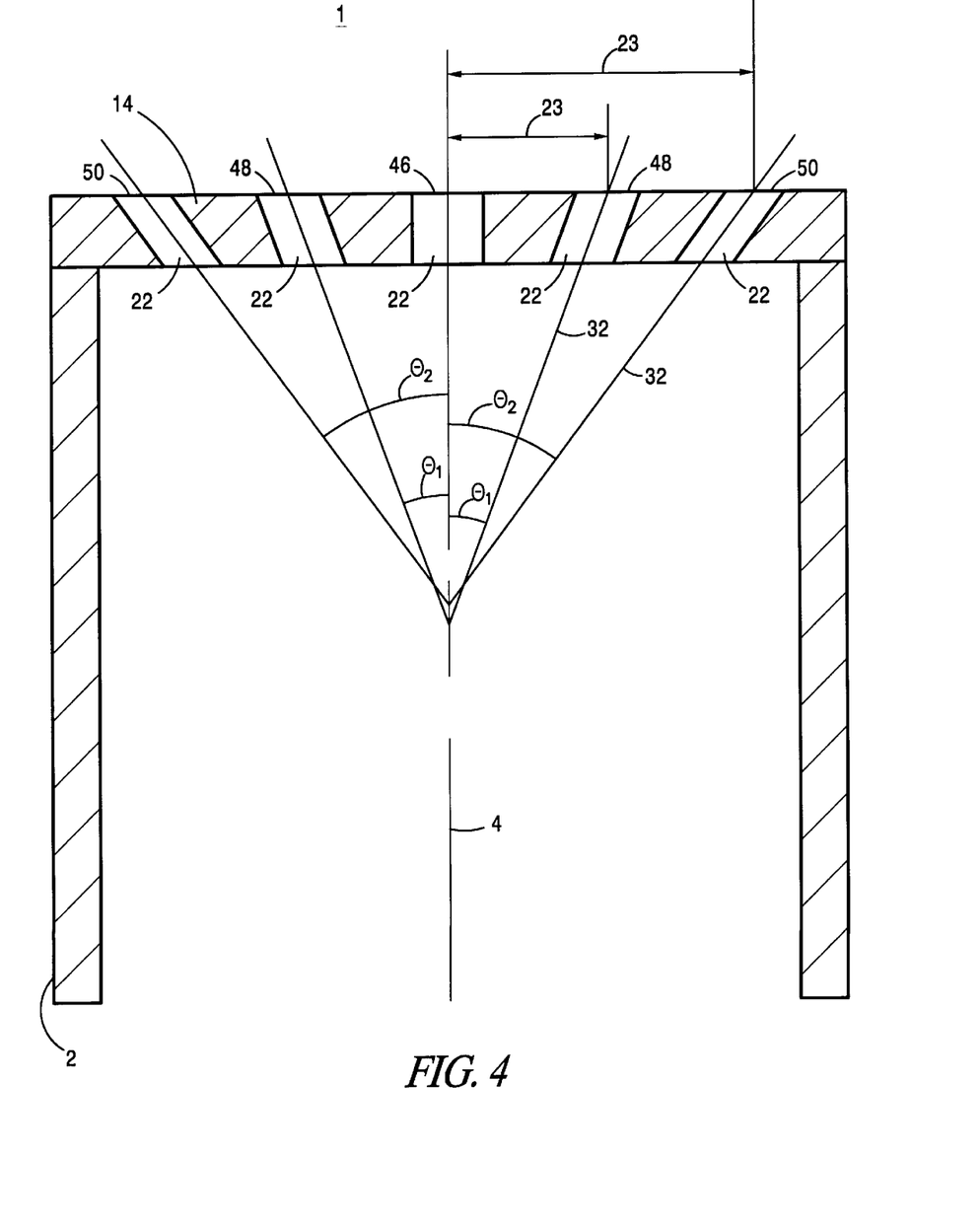
FIG. 4 shows a sectional view of another embodiment of a nozzle of the present invention.

In another preferred embodiment of the present invention, the angle θ between center longitudinal axis 32 of each opening and the nozzle barrel center longitudinal axis 4 increases as the distance 23 of the opening from the nozzle tip vertical centerline 20 increases. A gradually increasing angle θ is shown in FIG. 4. FIG. 4 shows a sectional view of a nozzle tip 14 having 5 openings. Preferably, the increase in angle θ is symmetric. For example, preferably, the first removed openings 48 are angled equally in opposite directions to form an angle $θ_1$ with the nozzle barrel center longitudinal axis, and the second removed openings 50 are also angled equally in opposite directions to form an angle $θ_2$ with the nozzle barrel center longitudinal axis, where $θ_2>θ_1$. Also, preferably, the center opening has a center longitudinal axis (not shown) that coincides with the center longitudinal axis 4 of the nozzel barrel 2 to form an angle $θ_0$ (not shown) equal to zero.

It is possible to have a nozzle tip with more than 5 openings, in which case the additional openings would be referred to as third removed, fourth removed, etc. In such an embodiment, preferably, the openings furthest removed from the nozzle tip vertical centerline would have the largest angle θ, the openings adjacent to the rest removed openings would have the next largest angle θ, and the angle θ of the openings would continue to decrease as the opening's distance 23 from the nozzle centerline decreased.

Preferably, the maximum θ of any opening is from 0° to about 75°, more preferably from 0° to about 60°, and most preferably from 0° to about 45°. Preferably, angled openings have an angle θ from between about 5° to about 75°, and more preferably from about 10° to about 60°. For any two adjacent openings the difference in angles (e.g., $θ_2-θ_1$) is preferably less than about 30°, and more preferably less than about 20°.

In a preferred embodiment of the present invention, the nozzle tip has 5 openings, where the first and second removed openings are angled. Preferably, the center opening has an angle θ of 0, the first removed openings have an angle θ of from about 10° to about 30°, and the second removed openings have an angle θ of from about 30° to about 60°.

In addition to the angling of the openings, the production of a flat fan-shaped spray of liquid droplets is enhanced through other design parameters of the openings. Generally, the design of the openings will need to take into account the desired mass flow rate of the dispersed liquid stream and the pressure drop available for directing the dispersed liquid stream through the nozzle tip. By "pressure drop" it is meant the pressure difference between the pressure of the liquid stream entering the nozzle (i.e., "feed-side pressure") and the pressure of the medium into which the nozzle discharges. Design parameters to produce a fan-shaped spray include the number of openings, the spacing of the openings, and the dimensions of the openings.

The number of openings in the nozzle tip is preferably designed to have the maximum number possible on the nozzle tip, while leaving adequate distance between the openings to provide enough strength to withstand the force of the dispersed liquid stream flowing through the nozzle tip. By such a configuration the total surfaces (i.e., the total perimeter of the openings) for shearing the liquid is maximized. The nozzle tip has at least three openings, preferably from about 3 to about 10 openings, more preferably about 3 to about 7 openings, and most preferably 5 openings. The openings are preferably spaced from the nozzle tip vertical centerline symmetrically so that for each opening spaced a distance from the nozzle tip vertical centerline, there is an opposing opening on the other side of the nozzle tip vertical centerline spaced an equal distance from the nozzle tip vertical centerline. More preferably, the openings are spaced so that one opening is located at the nozzle tip vertical centerline, and the remaining openings are symmetrically disposed from the nozzle tip vertical centerline leading to an odd number of openings on the nozzle tip. In addition to the openings being symmetrically disposed, it is preferred that the distance between any two adjacent openings as measured between the adjacent edges of the openings across the outer surface of the nozzle tip is from about 0.2 to about 2.5 times the width of the openings. The ratio of the spacing between two adjacent openings (measured from opening centerline to opening centerline) to the opening width is preferably from about 1.2 to about 3.5, and more preferably from about 1.3 to about 2.2.

With respect to the dimensions of the openings, preferably the width of an opening is chosen to produce fine liquid droplets and remain within the pressure drop constraints of the system. For example, generally, as the width of the opening is decreased, the average size of the liquid droplets decreases. However, as the width of the opening decreases, for a given number of openings, the pressure drop increases. The ratio of the width of the opening, as measured at the inner surface of the nozzle tip, to the inner diameter of the nozzle barrel is preferably from about 0.01 to about 0.30, more preferably from about 0.05 to about 0.25 and most preferably from about 0.075 to about 0.20.

Figure 5:
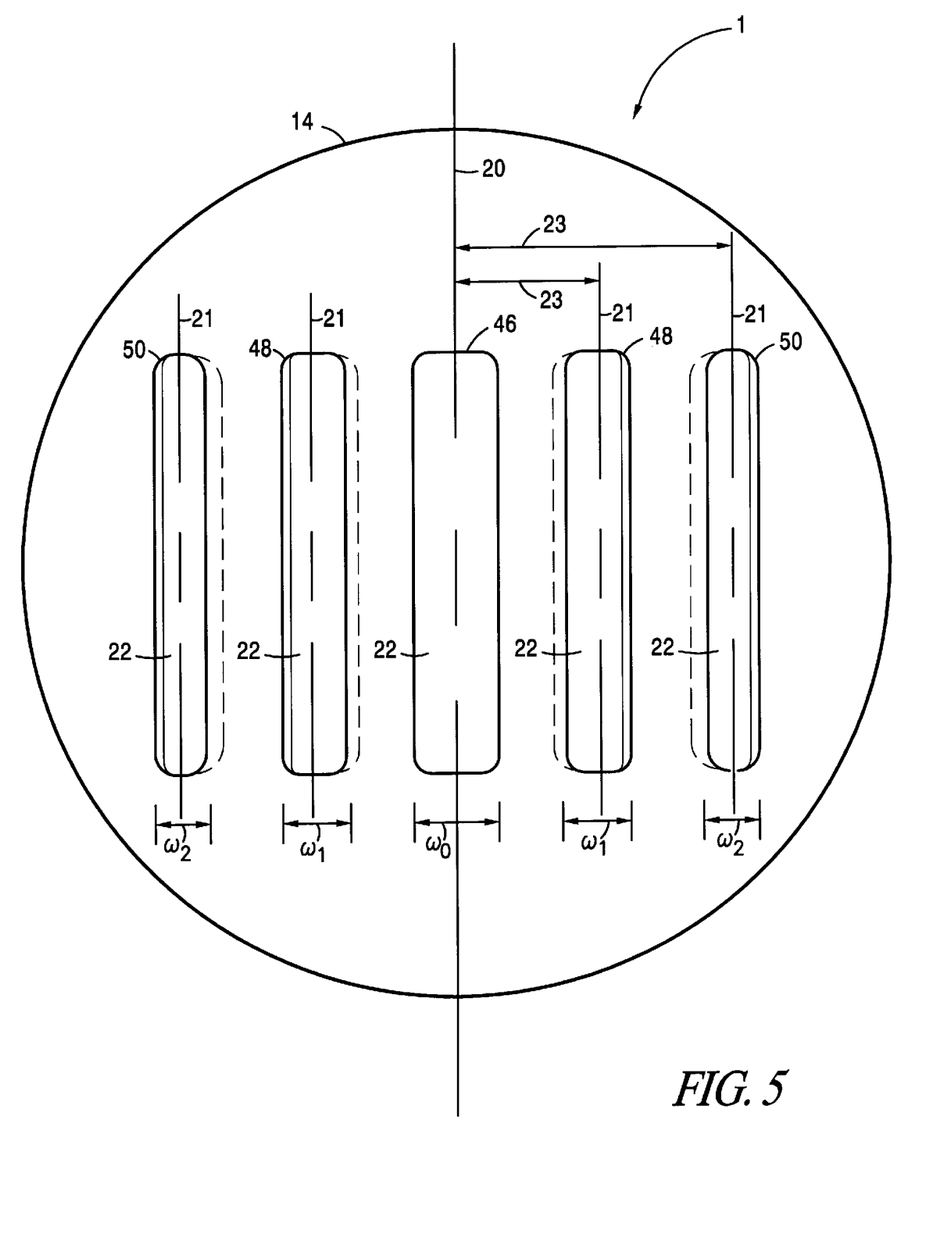
FIG. 5 shows an end view of another embodiment of a nozzle of the present invention.

The width of the opening is also preferably varied depending on the location of the opening relative to the nozzle tip vertical centerline to assure a uniform fan-shaped distribution of spray. There are several preferred embodiments. FIG. 5 shows one preferred embodiment.

FIG. 5 shows an end view of a preferred nozzle tip 14 having five slot shaped openings 22 that are symmetrically disposed from the nozzle tip vertical centerline 20. The opening located at the nozzle tip vertical centerline 20 is a center opening 46 and has a width, $w_0$. The openings located the next shortest distance to the nozzle tip vertical centerline 20 are first removed openings 48 and have a width, $w_1$, and the openings farthest from the nozzle tip vertical centerline 20 are second removed openings 50 and have a width, $w_2$, where all widths are measured on the inner surface (not shown) of the nozzle tip. Also as shown in FIG. 5, the first and second removed openings are angled similar to the openings in FIG. 4.

In the embodiment shown in FIG. 5, the width of the opening decreases as its distance 23 from the nozzle tip vertical centerline 20 increases. In other words, the width of the opening decreases as it is moved outward or is further removed from the nozzle tip vertical centerline 20. For example, the center opening 46 has the greatest width, the first removed openings 48 have the next greatest width, and the second removed openings 50 have the smallest width (i.e., $w_0>w_1>w_2$). Also, the widths of the openings are symmetrical so that the first removed openings have the same width and the second removed openings have the same width. This configuration is especially preferable when a uniform liquid flux (i.e., mass flow rate per cross-sectional area) is required across the entire width of the spray.

In another preferred embodiment (not shown), the first removed openings 48 have the greatest width, the center opening 46 has the next greatest width, and the second removed openings 50 have the smallest width (i.e., $w_1>w_0>w_2$). If it is desired to have additional openings located on the nozzle, preferably the width of openings beginning at the second removed openings gradually decrease so that the furthest removed opening would have the smallest width (i.e., $w_2>w_3>w_4$, etc). Such a configuration of opening widths is preferable when a higher liquid flux is required in the center section of the spray than in the outer edges of the spray. For example, such a configuration may be preferred when using multiple overlapping sprays.

In yet another preferred embodiment (not shown), the center opening has the smallest width, and the widths gradually increase as the opening's distance from the nozzle centerline increases (i.e., $w_2>w_1>w_0$). This embodiment is preferably used when a higher liquid flux is required at the outer edges of the spray than in the center.

In all embodiments where the opening width is varied, preferably the maximum width of any opening is from about 0.05 to about 0.30, and more preferably from about 0.10 to about 0.20, times the nozzle barrel inner diameter. Preferably, the minimum width of any opening is from about 0.05 to about 0.20, and more preferably from about 0.075 to about 0.15, times the nozzle barrel inner diameter.

Preferably, the length of the opening is chosen to produce a spray having a vertical spray angle of less than about 30° and to operate within the pressure drop constraints of the nozzle. To form a vertical shaped opening, the length is greater than the width. Preferably, the ratio of the opening length to opening width is at least about 3:1, more preferably at least 4:1, and most preferably from about 5:1 to about 10:1. The openings may vary in length depending on their distance from the nozzle tip vertical centerline. For example, the openings nearer the nozzle tip vertical centerline may be longer to make use of the full nozzle tip area and to minimize pressure drop. Preferably, all openings on the nozzle tip have the same length.

The edges forming the length and the width of the opening at the inner and outer surfaces of the nozzle tip are preferably sharp for shearing the dispersed liquid stream into liquid droplets. By "sharp", it is meant that the openings are machined to form pointed edges at the inner and outer surfaces of the nozzle tip, with preferably no rounding of the edges. Also, the openings may be of various geometrical shapes as long as the length is greater than the width and a horizontal flat fan-shaped spray is produced. Suitable geometric shapes include for example rectangles, round-end slots, elongated diamonds, and ellipses.

Although the embodiments shown in FIGS. 1 through 5 have nozzle tips that are flat, it is possible and in some cases preferable for the tip surface to be concave outward. A concave outward tip has the advantage of increasing the surface area upon which to locate multiple openings. Also, a concave outward tip may allow for more uniform coverage of a particular shaped area or for a desired liquid drop size distribution. The nozzle tip may be in the form of various concave outward shapes. For example, the shape may be a uniform shape, such as a shallow dome or hemisphere, or may be nonuniformly shaped, such as two or more flat surfaces meeting along vertical lines to form, for example, a folded disk.

The thickness of the nozzle tip is preferably the minimum thickness which will withstand the force of the dispersed liquid stream. Preferably, the ratio of the nozzle tip thickness to the width of the smallest opening is equal to or less than about 2.0, more preferably equal to or less than about 1.5, and most preferably equal to or less than about 1.0.

In addition to forming the nozzle with a cylindrically shaped conduit as shown in FIGS. 1 through 5, other geometrically shaped conduits may be used. For example, rectangular, elliptical, or polygonal shaped geometries may be used.

The nozzle of the present invention also preferably has a means for combining a liquid stream and dispersion medium upstream of the nozzle tip to provide a uniformly mixed dispersed liquid stream. By "uniformly mixed" it is meant that the pointwise volume fractions of liquid and gas are fairly constant across the nozzle cross-sectional area. For example, the liquid stream may be distributed throughout the dispersion medium as ligaments, or large or small drops. Any means suitable for combining the dispersion medium and liquid stream may be used as long as the dispersed liquid stream is uniformly mixed.

A preferred mixing device that may be used with the nozzle of the present invention is shown in FIG. 6. In FIG. 6, a nozzle 98 is shown having an initial atomizer 100, an expansion section 114, and a nozzle barrel 2. The initial atomizer 100 has a primary conduit 108 for receiving a stream of dispersion medium 126 through inlet 102, and secondary conduit 106 for receiving a liquid stream 128 through inlet 120. The primary conduit is cylindrically shaped and has a center longitudinal axis 130 that coincides with the secondary conduit center longitudinal axis (not shown) and is coaligned with the center longitudinal axis 4 of the nozzle barrel. At least a portion of the secondary conduit is located within the primary conduit to form an annular passageway 132 for the dispersion medium 126 between the outer surface 135 of the secondary conduit and the inner surface 137 of the primary conduit. Preferably the inner diameter of the primary conduit is from about 1.1 to about 2.5 times the outer diameter of the secondary conduit.

Liquid stream 128 and dispersion medium 126 are mixed by directing the dispersion medium through perforations 112 in the secondary conduit wall 134. The liquid stream 128 is vigorously mixed with the dispersion medium as the liquid passes to outlet 124 of the initial atomizer 100 to form a dispersed liquid stream 116.

The perforations 112 in the secondary conduit 106 are preferably drilled at right angles through the secondary conduit wall 134. Also preferably, the perforations 112 are located within ½ inch of the initial atomizer outlet 124. In a more preferred embodiment (not shown), there are two rows of perforations 112 where each row contains eight perforations uniformly distributed around the perimeter of the secondary conduit wall 134. If desired, the perforations 112 can be shifted downstream of the initial atomizer outlet 124, or supplemented with additional means for mixing the dispersion medium 126 with the liquid stream, such as tubes located within the secondary conduit.

The dispersed liquid stream 116 from outlet 124 is discharged into the expansion section 114. In the case of cylindrical shaped secondary and primary conduits, preferably the expansion section 114 comprises a truncated, inverted cone section. Preferably the expansion section 114 has an inner diameter at inlet 120 of the expansion section 114 approaching or equaling that of the inner diameter of the initial atomizer outlet 124. The diameter of the outlet 138 of the expansion section 114 preferably has a diameter roughly equal to that of the diameter of the nozzle barrel 2 at the inlet end 3 of the nozzle barrel. The expansion section wall 143 preferably forms an angle $\alpha$ with the wall 139 of the primary conduit 108 of from about 5° to about 30°, more preferably from about 10° to about 25°, and most preferably about 15°. The expansion section may also comprise more complex geometries, such as those used in venturi meters or carburetors, but such shapes are harder to fabricate and more expensive.

Another preferred mixing device that may be used with the nozzle of the present invention is disclosed in U.S. Pat.

Nos. 5,289,976 and 5,306,418, both to Dou et al., (hereinafter referred to as "Dou") which are hereby incorporated by reference in their entireties. Dou discloses a mixing device that is part of a nozzle. Dou discloses a mixing device that has an initial atomizer and expansion section similar to that described in FIG. 6, and an impingement plug that is located within the expansion section. In a preferred embodiment, the mixing device in Dou is used without the impingement plug as shown in FIG. 6.

Figure 6:
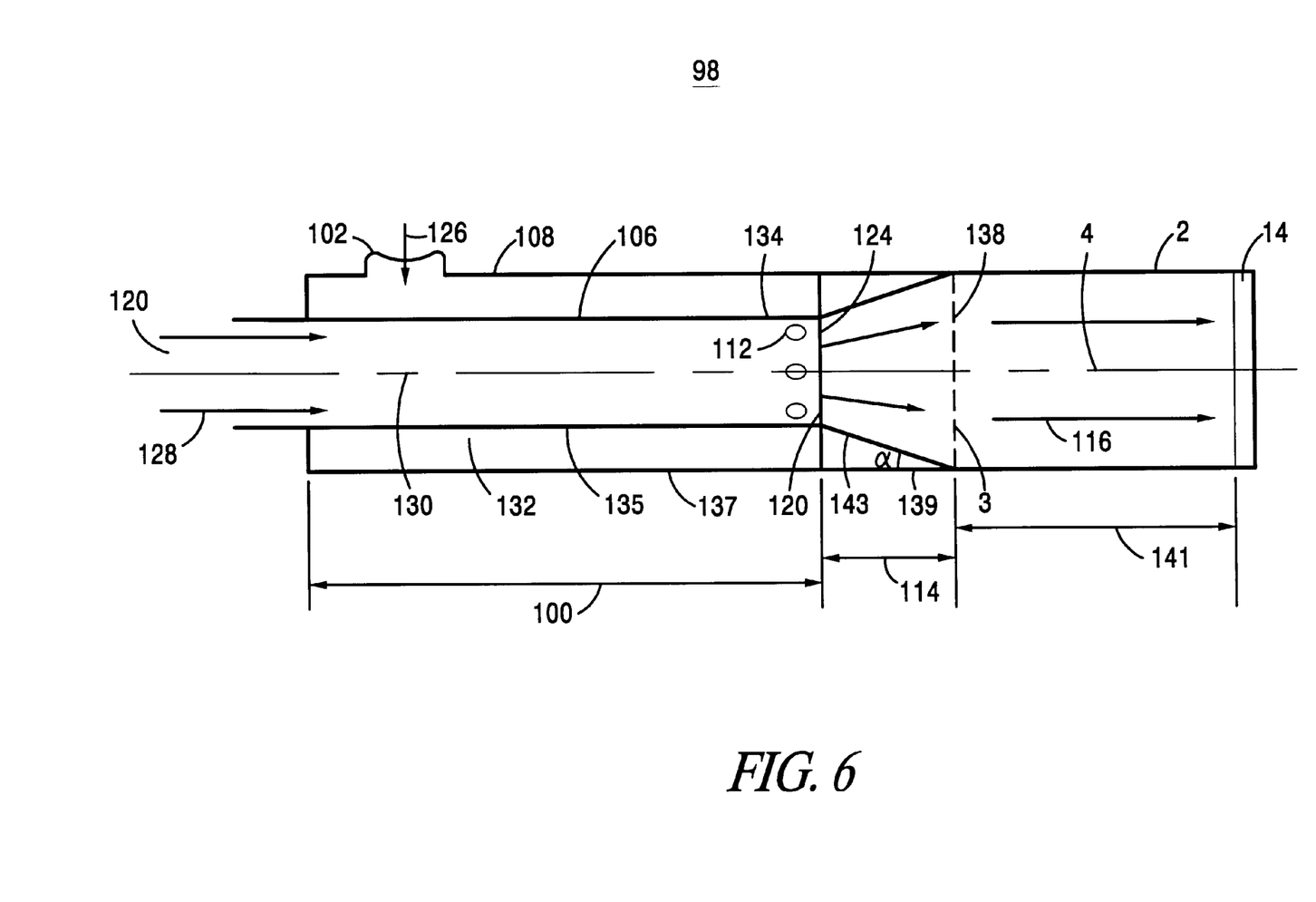
FIG. 6 shows a side view of a nozzle of the present invention having a mixing device upstream of the nozzle tip for combining a liquid and dispersion medium.

In the mixing device in FIG. 6 or Dou, the length 141 of the nozzle barrel 2 between the outlet 138 of the expansion section and nozzle tip 14 is long enough to allow the dispersed liquid stream to decelerate fully into the larger cross section of the barrel. Preferably, the length of the nozzle barrel between the outlet of the expansion section and nozzle tip is at least about 1.5 times, and more preferably from about 2.0 to about 4.0 times the inner diameter at the outlet to the expansion section.

Other suitable mixing devices that may be included within the nozzle of the present invention are for example, spiral mixers, vane packs, static mixers, or combinations thereof. One or more mixing devices may also be located external to the nozzle so that the nozzle is supplied with a dispersed liquid stream. Preferably, however, the mixing device is included as part of the nozzle.

Depending on the mixing device chosen, the dispersed liquid stream approaching the nozzle tip may have a residual swirling motion. Preferably, this residual swirling motion is eliminated prior to the dispersed liquid stream reaching the nozzle tip. For example, straightening vanes may be installed downstream of the mixing device to eliminate any residual swirling motion.

The nozzle, including the nozzle tip, may be constructed of any material that is capable of withstanding the temperatures, pressures, and chemicals that the nozzle is exposed to during the operation of an FCC catalytic cracking unit. For example, the nozzle tip will need to be constructed of materials to withstand the temperatures and abrasion of catalyst within the riser of an FCC catalytic cracking unit.

In the process of the present invention, a dispersed liquid stream containing a liquid stream and a dispersion medium, is directed through at least a portion of the nozzle of the present invention and through the openings of the nozzle tip to produce a fan-shaped spray. The dispersed liquid stream prior to reaching the nozzle tip is uniformly mixed. In a preferred embodiment, a liquid stream and dispersion medium are combined within the nozzle using a mixing device to form the dispersed liquid stream. As mentioned previously herein, any mixing device may be used as long as the dispersed liquid stream is uniformly mixed prior to reaching the nozzle tip. Preferably the mixing device contains an initial atomization zone and expansion section as shown in FIG. 6.

The proportion of dispersion medium to the liquid stream exiting the nozzle is adjusted to provide adequate atomization of the liquid stream. The amount of dispersion medium based on the total weight of the liquid stream exiting the nozzle is preferably from about 0.5 weight percent to about 5.0 weight percent, and more preferably from about 1.0 weight percent to about 3.5 weight percent.

The liquid stream useful in the process of the present invention is any stream containing a liquid that is to be atomized. The liquid stream may also optionally contain additives such as surfactants to enhance atomization. Preferably, the liquid stream contains at least 80 weight percent, and more preferably at least 90 percent liquid.

In a preferred embodiment of the process of the present invention, the liquid stream is a hydrocarbon feed that is to be catalytically cracked. The hydrocarbon feed may be any of the feedstocks commonly processed in a commercial fluid catalytic cracking unit. Preferably the hydrocarbon feed to be employed boils at a temperature of at least 400° F. and more preferably from about 400° F. to about 1000° F. Such hydrocarbon feeds include for example virgin gas oils, cycle gas oils, reduced crudes and residuals.

The dispersion medium may be any gas-containing stream that is effective at dispersing the liquid stream. Preferably, the dispersion medium contains at least 75 weight percent and more preferably from about 90 to 100 weight percent gas based on the total weight of the dispersion medium. The dispersion medium may be for example steam, air, fuel gas, butane, naphtha, other gaseous hydrocarbons, nitrogen, or inert gases such as argon, or helium, or combinations thereof. Preferably, the dispersion medium is steam.

The nozzle of the present invention is preferably used in a nozzle assembly containing at least three, and more preferably from about 6 to about 8 nozzles. The nozzles in the nozzle assembly are preferably mounted radially around the perimeter of a cross-sectional area to be sprayed. Also, the nozzles are preferably distributed at equal angular intervals around the periphery of the cross-sectional area to be sprayed. In a preferred embodiment, the nozzles are mounted so that the spray from each nozzle overlaps and intersects the sprays from one or more other nozzles. More preferably, the nozzles are mounted so that the spray from each nozzle overlaps the sprays of the nozzle adjacent to it and intersects the sprays from opposing nozzles.

The nozzle and nozzle assembly of the present invention may be used in any application where it is desired to atomize a liquid into a flat fan-shaped spray. For example, the nozzle of the present invention may be used to inject liquid reactants into various types of reaction vessels, disperse a liquid additive over a large area (such as a defoaming chemical on a foam layer), spray cooling liquid into a gas phase, or provide atomized water for firefighting purposes. In a preferred embodiment of the present invention, the nozzle and nozzle assembly is used to atomize a hydrocarbon feed into a catalytic cracking unit. Preferably the nozzle of the present invention is used to spray hydrocarbon feed into a riser catalytic conversion zone or a dense fluid bed reactor. Most preferably, the nozzles are used to spray hydrocarbon feed into a riser catalytic conversion zone.

Figure 7A:
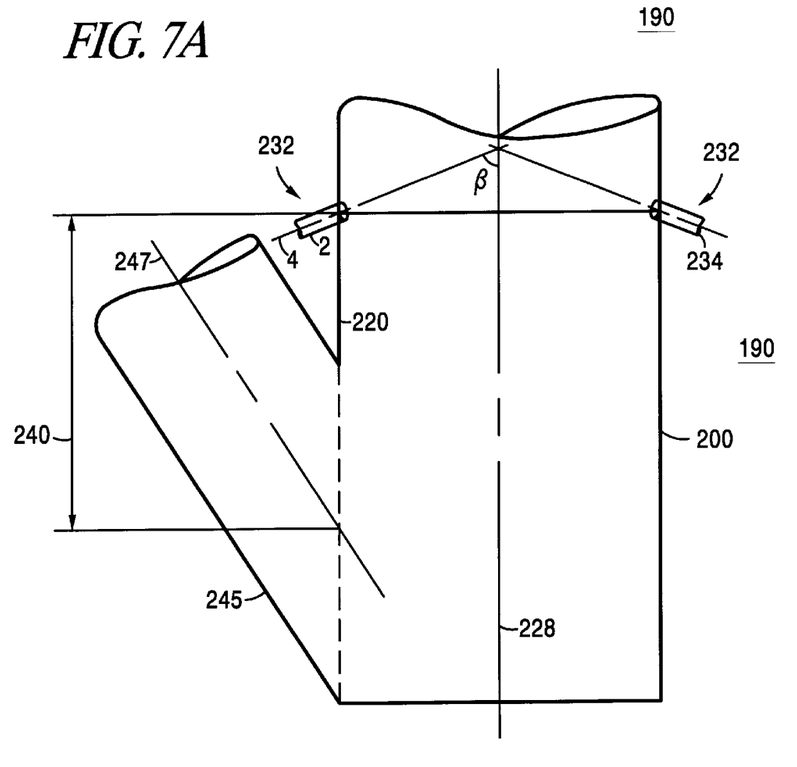
FIG. 7A shows a nozzle assembly of the present invention used in the riser section of an FCC unit.
Figure 7B:
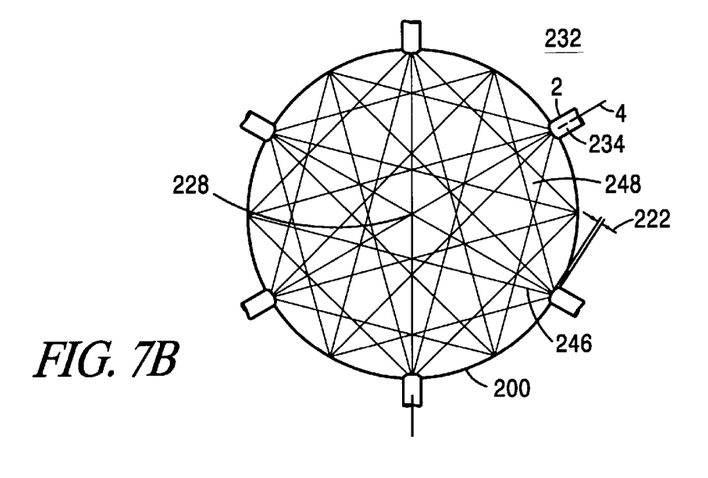
FIG. 7B shows a plan view of the nozzle assembly of FIG. 7A.

A preferred configuration for a nozzle assembly of the present invention is shown in FIGS. 7A and 7B. FIG. 7A shows a nozzle assembly 232 of the present invention that is secured to the riser section 200 of an FCC reactor 190. The nozzles 234 point slightly upward into the riser 200 by an angle $\beta$. Angle $\beta$ is defined as the angle between the vertical longitudinal axis 228 of the riser and the nozzle barrel center longitudinal axis 4. Preferably, the angle $\beta$ is from about 10° to about 90°, more preferably from about 10° to about 80°, and most preferably from about 10° to about 45°.

The vertical distance 240 from the nozzle 234 to the regenerated catalyst transfer line 245 is chosen to allow the fluidized catalyst stream to establish a fairly uniform velocity profile across the riser cross section after passing around the sharp bend at the base of the riser. The vertical distance 240 is preferably at least about 1.0 to about 1.5 times, and more preferably at least about 2.0 to about 4.0 times the inner diameter of the riser. The vertical distance 240, as shown in FIG. 7A is measured from the center longitudinal axis 4 of the nozzle barrel 2 to the center longitudinal axis 247 of the regenerated catalyst transfer line 245 at the inner wall 220 of the riser 200. The nozzle assembly of the present invention may also be used in a riser having no sharp bends in which the approaching catalyst instead passes through smoothly curved bends to reach the hydrocarbon feed injection zone.

FIG. 7B shows a plan view of the nozzle assembly 232 as viewed looking vertically downward in the riser. As shown in FIG. 7B, the nozzle assembly 232 contains 6 radially mounted nozzles 234, each having five openings per nozzle 234. Each nozzle preferably extends minimally into the riser by a radial distance 222 chosen just large enough to ensure that the entire nozzle tip is located inside the riser inner wall 220 despite the inclination angle β. The nozzles 234 are oriented so that the length of the openings (not shown) in the nozzle tips are substantially vertical relative to the riser vertical longitudinal axis 228. As described previously, this orientation of the openings in the nozzle tip results in a horizontal fan-shaped spray. It is unexpected that such an orientation of openings would result in a flat fan-shaped spray, given that in the past, an opening that is horizontal relative to the riser longitudinal axis has been generally used to create a flat spray. Although in no way intending to be limited in theory, it is believed that substantially vertical openings produce a flat horizontal spray, not by shaping, but by the shearing created as the liquid stream passes over the opening vertical edges on the inner and outer surfaces of the nozzle tip.

The nozzles in FIG. 7B are spaced around the perimeter of the riser so that each nozzle produces a spray 246 that intersects the sprays of the two adjacent nozzles. By such a configuration, individual mixing cells 248 are formed to enhance the transverse mixing of the hydrocarbon feed and solid catalyst. As can be observed from FIG. 7B, each nozzle is oriented so that the liquid stream spray from the central slot is directed radially inward within the riser, while the liquid stream sprays from the first and second removed slots are directed off-center within the riser. Having both off-center and on-center sprays from each nozzle results in a spray that "crosshatches" the entire riser to maximize the interphase area for contacting the solid catalyst with the hydrocarbon feed.

In addition to radially mounted nozzles, it is possible to mount the nozzles axially, however, this is not as preferred, since flat fan-shaped sprays are more effective in covering the riser cross-sectional area when radially discharged.

EXAMPLES

The nozzle of the present invention was tested to determine its effectiveness in producing a fan-shaped spray of fine liquid droplets. A nozzle having an inner diameter of 6 inches at the tip and similar to the nozzle in FIG. 4 was tested with different nozzle tips. The nozzle was constructed from lathed acrylic tubing. Alternative nozzle tips varying in shape, the number of openings, opening orientation, and opening size were fabricated in standard threaded PVC pipe caps, flat metal discs, or Lexan™ discs. The discs were held in place at the perimeter of the nozzle end by a threaded PVC collar.

Water and air were used to simulate atomizing a mixture of hydrocarbon feed (as the liquid stream) and steam (as the dispersion medium) in an FCC unit. Rates of water and air were chosen to accurately reproduce the flow behavior of the true two-phase mixture of steam and hydrocarbon feed by matching appropriate fluid mechanical groups. Air was supplied to the nozzle at an inlet pressure of approximately 50 pounds per square inch gauge (psig) after being cooled to within 10° F. of ambient temperature by a fin-fan after cooler. Water was supplied to the nozzle at ambient temperature of about 60° F. and pressure of 20 psig to 30 psig.

The nozzle assembly was strapped horizontally to a steel stand and held stationary against backward thrust by concrete weights to discharge a spray horizontally. The static pressure was monitored at various locations along the length of the nozzle.

Drop size of the dispersed liquid strem exiting the nozzle was measured using a Model 700 Spray Analysis System supplied by Greenfield Instruments, Inc. The analyzer was located 32 inches from the nozzle tip to ensure equilibrium drop formation prior to sampling the spray and to approximate the radial distance on a large FCC riser. The analyzer operated by capturing instantaneous droplet population images which were then quantified by a computer in terms of pixels. The volume and surface area were then calculated for the droplets by software to determine a Sauter mean diameter (i.e., the diameter of a sphere having the same volume to surface area ratio as the fill droplet population).

In each experiment the nozzle tip to be tested was secured onto the nozzle and the air and water rates were adjusted to simulate a mixture of 12,500 barrels per day of hydrocarbon feed per nozzle and 3.2 weight percent steam based on the weight of hydrocarbon feed. Once steady conditions were achieved, pressures were recorded along the length of the nozzle and the spray pattern was observed. Also, drop size of the dispersed liquid stream exiting the nozzle was measured. Following droplet data collection, the pressure profile and flow rates were rechecked to ensure there was no significant variation.

The dimensions of the various nozzle tips tested are shown in Table 1. In Table 1, the nozzle tip openings were slot shaped and smmetrically disposed from the nozzle centerline. The thickness of the nozzle tips tested ranged from ⅜ inch to ½ inch.

TABLE 1

Dimensions of Nozzle Tip

| Ex.[1] | No./ Orient. of Open[2] | Angle Opening[3] $\phi_0$ | $\phi_1$ | $\phi_2$ | Width[4] (inches) $W_0$ | $W_1$ | $W_2$ | Length[5] | Tip[6] | Spacings[7] (inches) $S_1$ | $S_2$ |
|---|---|---|---|---|---|---|---|---|---|---|---|
| C1 | 1/H | 0 | — | — | 2 | — | — | 4 3/4 | cap | — | — |
| C2 | 3/H | 0 | 22.5 | — | 3/4 | 3/4 | — | 4 3/4 | cap | 1/2 | — |
| 3 | 5/V | 0 | 0 | 0 | 5/8 | 5/8 | 5/8 | 3 | disc | 7/16 | 7/16 |
| 4 | 5/V | 0 | 0 | 0 | 3/4 | 5/8 | 1/2 | 3 1/8 | disc | 7/16 | 7/16 |
| 5 | 5/V | 0 | 0 | 0 | 3/4 | 5/8 | 1/2 | 3 1/8 | disc | 7/16 | 7/16 |
| 6 | 5/V | 0 | 30 | 45 | 3/8 | 1/2 | 5/8 | 2 | cap | 19/32 | 19/32 |
| 7 | 4/V | — | 15 | 30 | — | 3/4 | 3/4 | 3 5/8 | cap | 1/2 | 1/2 |
| 8 | 5/V | 0 | 15 | 30 | 5/8 | 5/8 | 5/8 | 3 1/8 | disc | 7/16 | 7/16 |
| 9 | 5/V | 0 | 15 | 30 | 3/4 | 5/8 | 1/2 | 3 1/8 | disc | 7/16 | 7/16 |
| 10 | 5/V | 0 | 15 | 30 | 5/8 | 19/32 | 17/32 | 3 1/8 | disc | 7/16 | 29/64 |
| 11 | 5/V | 0 | 15 | 30 | 5/8 | 37/64 | 29/64 | 3 3/8 | disc | 7/16 | 29/64 |

[1]Examples, C1 and C2 are comparatives.

[2]H indicates the openings are oriented horizontally, and V indicates the openings are oriented vertically, with respect to the nozzle centerline.

[3]Angle $\phi$ is the angle between the opening center longitudinal axis and nozzle barrel center longitudinal axis. Angle $\phi_0$ is the angle of the opening located on the nozzle centerline, $\phi_1$ is the angle of the first removed openings, and $\phi_2$ is the angle of the second removed openings.

[4]The width is the shorter dimension of the opening. For vertical openings, the width runs perpendicular to the nozzle tip vertical centerline, and for horizontal openings, the width runs parallel to the nozzle tip vertical centerline. $W_0$ is the width of the opening located on the nozzle centerline, $W_1$ is the width of the first removed openings, and $W_2$ is the width of the second removed openings.

[5]Length is the longer dimension of the openings. For vertical openings, the length runs parallel to the nozzle tip vertical centerline, and for horizontal openings, the length runs perpendicular to the nozzle tip vertical centerline.

[6]Shape of nozzle tip. A cap is dome, concave outward. A disc is flat and perpendicular to the center longitudinal axis of the nozzle barrel.

[7]Spacing is the edge to edge distance between adjacent openings, measured along the outer surface of the tip. $S_1$ is the distance between the center and first removed openings, or if no center opening is present, $S_1$ is the distance between the two first removed openings. $S_2$ is the distance between the first removed and second removed openings.

The results of the nozzle tips tested are shown in Table 2. As can be seen from Examples 3 through 11 in Table 2, the nozzle of the present invention is effective in atomizing a liquid stream into a fan-shaped spray of fine liquid droplets. In comparison, the horizontally oriented openings (Comparative Examples C1 and C2) resulted in a spray having larger droplets and a smaller horizontal spray angle. Additionally, the single horizontally oriented opening (Comparative Example C1) resulted in a round shaped spray, whereas the nozzle sprays in Examples 3 to 11 were relatively flat and fan-shaped. In Examples 3 through 5, all openings on the nozzel tip had an angle θ between the center longitudinal axis of the opening and the center longitudinal axis of the nozzle barrel of zero. Examples 6 to 11, in comparison to Examples 3 to 5, had a gradually increasing angle θ of the openings as the distance of the opening from the nozzle tip vertical centerline increased. The results of Examples 6 to 11, in comparison to Examples 3 to 5, show that the horizontal spray angle can be increased by increasing the angle θ of the opening as the opening's distance from the nozzle tip vertical centerline is increased.

TABLE 2

Effectiveness of Nozzle Tip

| Example | ΔP[8] (psi) | Drop Size[9] (μm) | Horizontal Spray Angle[10] (°) |
|---|---|---|---|
| C1 | 25.6 | 900 | 30 |
| C2 | 24.2 | 820 | 40 |
| 3 | 26.5 | 690 | 65 |
| 4 | 21.0 | 680 | 65 |
| 5 | 18.6 | 670 | 65 |

TABLE 2-continued

Effectiveness of Nozzle Tip

| Example | ΔP[8] (psi) | Drop Size[9] (μm) | Horizontal Spray Angle[10] (°) |
|---|---|---|---|
| 6 | 35.9 | 640 | 95 |
| 7 | 26.2 | 720 | 80 |
| 8 | 21.1 | 590 | 95 |
| 9 | 21.3 | 580 | 100 |
| 10 | 26.9 | 580 | 100 |
| 11 | 24.5 | 560 | 105 |

[8]Pressure drop is the static pressure of the liquid stream measured at the inlet of the secondary conduit in FIG. 6 when the nozzle discharges to atmospheric pressure.

[9]Sauter Mean diameter droplet size.

[10]Angle subtended by the spray in a horizontal plane containing the nozzle barrel center longitudinal axis.

Although the present invention has been described above with respect to particular preferred embodiments, it will be apparent to those skilled in the art that numerous modifications and variations can be made to those designs. The descriptions provided are for illustrative purposes and are not intended to limit the invention.

What is claimed is:

1. An atomizing nozzle for atomizing a liquid stream into a fan-shaped spray comprising:

(a) a nozzle barrel for receiving a liquid stream and dispersion medium, having a center longitudinal axis, an inlet end, and a tip end;

(b) a tip, connected to the tip end of the nozzle barrel and having a vertical centerline, an inner surface and an outer surface; and (c) at least three substantially vertical openings capable of atomizing the liquid stream into liquid droplets, the openings extending through the inner surface of the tip to the outer surface of the tip, each opening having a length and a width, wherein the length of the opening is greater than the width and the length runs in a direction substantially vertical relative to the tip vertical centerline; each opening further having a first midpoint on the inner surface of the tip, and a second midpoint on the outer surface of the tip, and a center longitudinal axis formed by a line intersecting the first and second midpoints, and wherein an angle θ, formed between the center longitudinal axis of each opening and the center longitudinal axis of the nozzle barrel, is from 0 to about 75 degrees.

2. The nozzle of claim 1 wherein the center longitudinal axes of the openings remain apart downstream of the nozzle tip.

3. The nozzle of claim 1 wherein at least two of the openings have an angle θ greater than 0.

4. The nozzle of claim 1 wherein the angle θ of the openings increases as the distance of the openings from the tip vertical centerline increases.

5. The nozzle of claim 1 wherein the tip has from about 3 to about 10 openings.

6. The nozzle of claim 1 wherein the tip has five openings.

7. The nozzle of claim 1 wherein the openings are slot shaped.

8. The nozzle of claim 1 wherein the length-to-width ratio of the openings is from about 3:1 to about 10:1.

9. The nozzle of claim 1 wherein the width of the openings decreases as the distance of the openings from the tip vertical centerline increases, or the width of the openings increases as the distance of the openings from the tip vertical centerline increases.

10. The nozzle of claim 1 wherein one opening is located on the tip vertical centerline and the remaining openings are symmetrically disposed from the tip centerline.

11. The nozzle of claim 10 wherein the first removed openings from the tip vertical centerline have the greatest width and the center opening has the next greatest width.

12. The nozzle of claim 11 wherein the nozzle has at least 5 openings and the remaining openings beyond the first removed openings decrease in width as the distance of the openings from the tip vertical centerline increases.

13. The nozzle of claim 1 wherein the tip is in the shape of a flat disc or is shaped concave outward.

14. The nozzle of claim 1 wherein the nozzle further comprises
a mixing device, wherein the mixing device comprises
(i) an initial atomizer having a primary conduit for receiving a dispersion medium and a secondary conduit for receiving a liquid stream; wherein the primary conduit has a center longitudinal axis that is coaligned with the nozzle barrel center longitudinal axis, an inner surface, and an inlet, wherein the secondary conduit has a center longitudinal axis aligned with the nozzle barrel center longitudinal axis, an outer surface, an inlet end, an outlet end and a plurality of radially distributed perforations drilled through the secondary conduit for directing the dispersion medium into the secondary conduit; and wherein at least a portion of the secondary conduit is positioned within the primary conduit to form at least one passageway between the outer surface of the secondary conduit and the inner surface of the primary conduit for the dispersion medium; and (ii) an expansion section having an inlet end and an outlet end, and gradually increasing in cross-sectional area from the inlet end to the outlet end, wherein the inlet end of the expansion section is connected with the secondary conduit outlet end and the outlet end of the expansion section is connected with the inlet end of the nozzle barrel.

15. A nozzle assembly for atomizing a liquid stream comprising at least 3 atomizing nozzles that are radially mounted around a perimeter of an area to be sprayed, wherein each nozzle comprises (a) a nozzle barrel for receiving a liquid stream and dispersion medium, having a center longitudinal axis, an inlet end, and a tip end;

(b) a tip, connected to the tip end of the nozzle barrel and having a vertical centerline, an inner surface, and an outer surface; and (c) at least three substantially vertical openings capable of atomizing the liquid stream into liquid droplets, the openings extending through the inner surface of the tip to the outer surface of the tip, each opening having a length and a width, wherein the length of the opening is greater than the width and the length runs in a direction substantially vertical relative to the tip vertical centerline; each opening further having a first midpoint on the inner surface of the tip, and a second midpoint on the outer surface of the tip, and a center longitudinal axis formed by a line intersecting the first and second midpoints, and wherein an angle θ, formed between the center longitudinal axis of each opening and the center longitudinal axis of the nozzle barrel, is from 0 to about 75 degrees.

16. The nozzle assembly of claim 15 wherein at least two of the openings have an angle θ greater than 0.

17. The nozzle assembly of claim 15 wherein the assembly comprises at least 6 nozzles and is mounted to a riser of a fluid catalytic cracking unit.

18. A process for atomizing a liquid stream comprising:

(a) combining a liquid stream and dispersion medium to form a dispersed liquid stream;

(b) feeding the dispersed liquid stream through at least a portion of at least one atomizing nozzle having a nozzle barrel, wherein the nozzle barrel has a longitudinal axis, an inlet end, and a tip end;

(c) directing the liquid stream through a tip connected to the tip end of the nozzle barrel, wherein the tip has a vertical centerline, an inner surface, an outer surface, and at least three substantially vertical openings extending through the inner surface of the tip to the outer surface of the tip, each opening having a length and a width and the length runs in a direction substantially vertical relative to the tip vertical centerline, wherein the length of the opening is greater than the width; each opening further having a first midpoint on the inner surface of the tip, and a second midpoint on the outer surface of the tip, and a center longitudinal axis formed by a line intersecting the first and second midpoints, and wherein an angle θ, formed between the center longitudinal axis of each opening and the center longitudinal axis of the nozzle barrel, is from 0 to about 75 degrees; and (d) directing the dispersed liquid stream through the openings of the tip to form a flat fan-shaped spray.

19. The process of claim 18 wherein at least two of the openings have an angle θ greater than 0.

20. The process of claim 18 further comprising the step of feeding the liquid stream and dispersion medium separately into the nozzle and wherein the liquid stream and dispersion medium are combined within the nozzle.

* * * * *